INVENTORS.
Daniel F. Jansen,
BY Manfred E. Meyer
Harness, Dickey & Pierce
ATTORNEYS

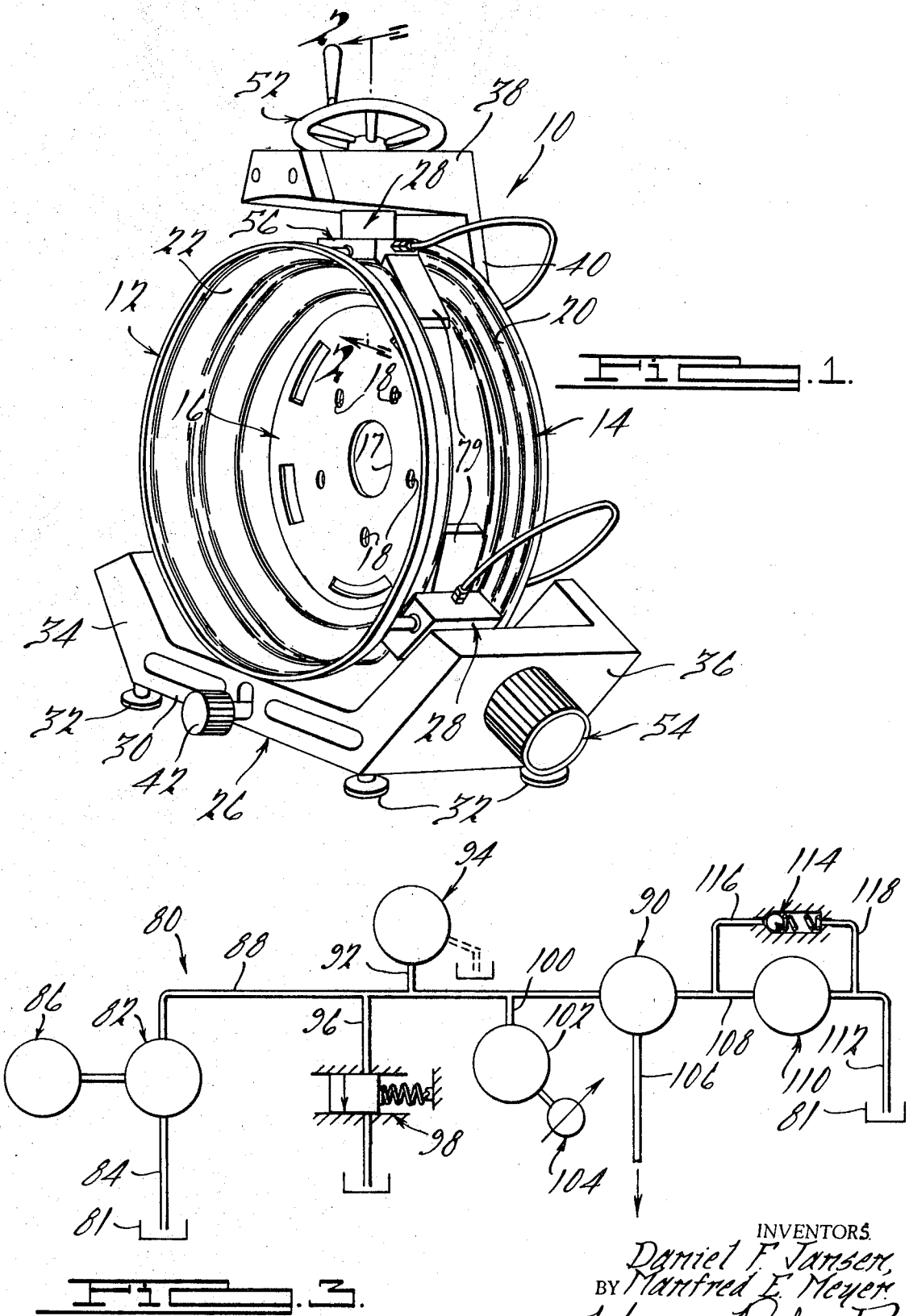

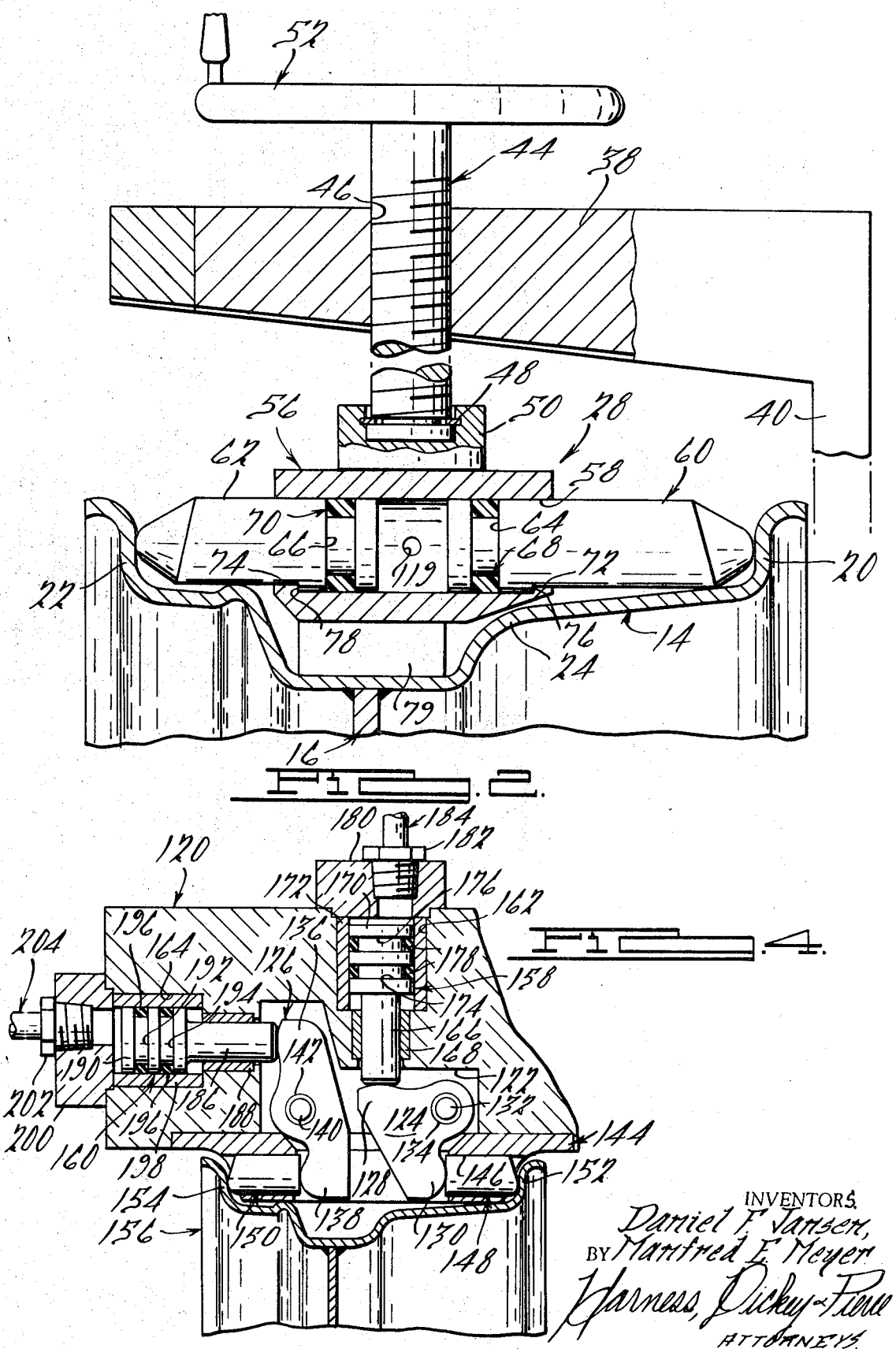

United States Patent Office

3,559,468
Patented Feb. 2, 1971

3,559,468
METHOD AND APPARATUS FOR RIM FATIGUE AND TESTING DEVICE
Daniel F. Jansen, Ypsilanti, and Manfred E. Meyer, Ann Arbor, Mich., assignors to Kelsey-Hayes Company, Romulus, Mich., a corporation of Delaware
Filed July 12, 1968, Ser. No. 744,474
Int. Cl. G01n 3/00
U.S. Cl. 73—91
13 Claims

ABSTRACT OF THE DISCLOSURE

An apparatus for testing wheel rims of the type comprising one or more radially outwardly projecting rim flange portions; the apparatus including a support structure for operatively supporting the wheel rim in a preselected test position; a force applying piston member disposed adjacent each rim flange portion; means for supporting the piston for reciprocable movement toward and away from the adjacent rim flange portion; and means for effecting selective actuation of the piston, whereby axially directed forces of predetermined magnitude are selectively applied against the rim flange portion to determine the fatigue characteristics of the wheel rim.

BACKGROUND OF THE INVENTION

In the production of automotive vehicle wheels, it is the practice to randomly select sample wheels from the production line for purposes of examining the structural characteristics thereof so as to assure that the desired production quality control is maintained. One of the tests to which such sample wheels are subjected concerns the fatigue characteristics of the wheel rims. Such fatigue tests have been heretofore accomplished by rotatably supporting the wheel, having and associated tire mounted thereon, and thereafter rotating the wheel by peripherally engaging the tire with a large diameter rotating "bull wheel" which is adapted to exert forces of relatively large magnitude against the road engaging surface of the tire. Such forces applied by the bull wheel are transmitted through the tire to the rim flange sections of the wheel and eventually result in fatigue failure of the rim flanges, safety hump radius and well radii of the wheel rim, with such failures being initially evidenced by very small cracks which appear in the wheel rim.

Such methods of fatigue testing vehicle wheel rims have been subjected to objectionable criticism due to the fact that the actual testing procedures have been extremely time consuming, with a typical test requiring up to 60 hours of operation of a bull wheel apparatus before a fatigue failure develops. Moreover, such testing procedures have been objectionable due to the fact that considerable expenses have been incurred in the installation and operation of the bull wheel testing devices, with the bull wheels themselves running upwards in size to 10–12 feet in diameter and having a weight of several hundred pounds. Moreover, the attendant support structures for operatively supporting the bull wheels, to say nothing of the drive means required to effect rotation thereof, has been the source of considerable expense. Further objections to such testing apparatus has resulted from overheating problems which frequently exist, in spite of the provision of ancillary cooling devices, and also from the very nature of the bull wheel type apparatus since it has heretofore been impossible to determine the fatigue characteristics of a particular peripheral portion of a vehicle wheel rim because the bull wheels merely rotate the vehicle wheels and cause a failure to occur in the weakest portion thereof. Thus, it was purely speculative and conjectural where a fatigue failure might develop in a wheel and the fatigue characteristics could not be ascertained at any preselected circumferential portion of a wheel rim.

In accordance with the principles of the present invention a new and improved wheel rim fatigue testing apparatus is provided which is adapted to overcome all of the objectionable characteristics of the aforementioned type fatigue testing devices. In particular, the present invention provides a novel rim testing apparatus which incorporates one or more fatigue testing assemblies, each of which utilizes one or two reciprocally mounted pistons that are adapted to be disposed adjacent the rim flanges of a wheel rim and be actuated in a manner so as to apply successive axially outwardly directed forces against the rim flanges and thereby determine the fatigue characteristics of the wheel rim. By virtue of the fact that the test assemblies may be located circumferentially around a wheel rim at any preselected position thereon, the fatigue characteristics of any specific portion of the rim may be determined at will. The testing apparatus of the present invention is of an extremely simple and compact design and hence may be easily and economically operated. The apparatus, for example, may be bench mounted either by itself or in operative association with a series of such apparatus and in either a vertical or horizontal position, thereby indicating the extreme compactness and universality of application thereof. A particular feature of the present invention resides in the fact that wheel rims may be analyzed for fatigue characteristics without requiring that the wheel rims be mounted on their associated spider members, thereby reducing the time and expenses involved in performing a fatigue analysis.

SUMMARY OF THE INVENTION

This invention relates generally to testing apparatus and more particularly to a new and improved apparatus for testing the fatigue characteristics of automotive, truck and similar type vehicle wheels.

It is accordingly a general object of the present invention to provide a new and improved wheel testing apparatus.

It is a more particular object of the present invention to provide a new and improved apparatus for studying the fatigue characteristics of vehicle wheel rims.

It is yet a more particular object of the present invention to provide a new and improved apparatus of the above character which exhibits superior load, stress and temperature control, thus reducing data spread and enhancing statistical fatigue analysis.

It is another object of the present invention to provide a new and improved wheel rim testing apparatus of the above character which is of an extremely simple and compact design.

It is a further object of the present invention to provide a new and improved wheel rim testing apparatus which may be economically manufactured and operated and which will find universality of application.

It is a further object of the present invention to provide a wheel rim testing apparatus of the above character which is adapted to ascertain accurate fatigue analysis in a substantially shorter amount of time than was required with heretofore known and used testing devices.

It is still another object of the present invention to provide a new and improved wheel rim testing apparatus which may be used to determine the fatigue characteristics of a wheel rim at a specific circumferential location thereon.

It is a yet further object of the present invention to provide a new and improved rim testing apparatus which is adapted to be used in determining the fatigue characteristics of both single and double flanged wheel rims.

Other objects and advantages of the present invention will become more apparent from the following detailed description, taken in conjunction with the accompanying drawings.

BRIEF DESCRIPTION OF THE DRAWINGS

FIG. 1 is an elevated perspective view of a preferred embodiment of the wheel rim testing apparatus of the present invention;

FIG. 2 is an enlarged fragmentary cross-sectional view taken substantially along the line 2—2 of FIG. 1;

FIG. 3 is a schematic illustration of a portion of the hydraulic circuitry incorporated in the apparatus shown in FIG. 1;

FIG. 4 is a fragmentary cross-sectional view of an alternate embodiment of the wheel rim testing apparatus of the present invention;

DETAILED DESCRIPTION OF A PREFERRED EMBODIMENT

Figure 5:
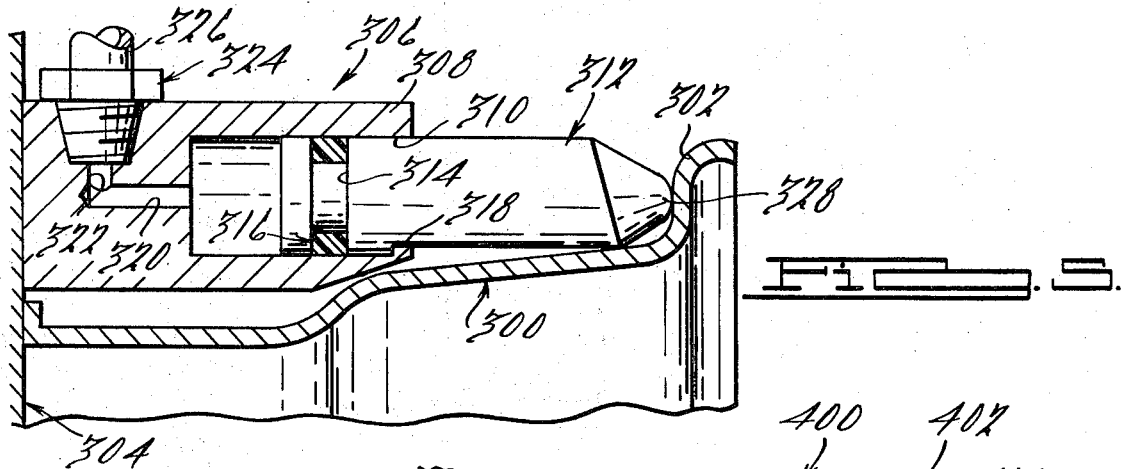
FIG. 5 is a fragmentary cross-sectional view of yet another alternate embodiment of the wheel rim testing apparatus of the present invention.

Generally speaking, the present invention is directed toward a new and improved apparatus for testing the fatigue characteristics of a vehicle wheel rim. The apparatus comprises a plurality of testing assemblies, each of which includes one or more force applying members which are adapted to be operatively disposed adjacent the rim flanges of the wheel rim being tested, the force applying members being selectively actuated in a manner so as to exert successive axially outwardly directed forces against the rim flanges. In its broader aspects, the present invention is not limited to any specific means for operatively supporting the force applying members, nor to any specific type of device for selectively actuating the force applying members in a manner so as to ascertain the rim fatigue characteristics; however, preferred embodiments of such support and actuating means are hereinafter described in detail, it being apparent, of course, that the scope of the present invention is not limited to the specific constructions shown and described herein, and that said constructions are merely exemplary of various ways of practicing the principles of the present invention.

Referring now to FIGS. 1 through 3 of the drawings, a wheel rim testing apparatus 10, in accordance with one preferred construction of the present invention, is shown in operative association with a typical vehicle wheel 12 consisting of an annular wheel rim 14 and an internal wheel spider member 16 having a suitable hub and stud receiving opening 17 and 18, respectively, for securing the wheel 12 to an associated automotive vehicle or the like. As best seen in FIG. 2, the wheel rim 14 comprises a pair of radially outwardly extending rim flange portions 20 and 22 which are integrally connected at the radially innermost portions thereof to an axially extending intermediate portion 24. Broadly speaking, the apparatus 10 comprises a support structure 26 which is adapted to support the wheel 12 in a preselected test position, and a plurality of fatigue testing assemblies, generally designated 28, which are circumferentially spaced around the wheel 12 when the same is mounted on the apparatus 10 and are adapted to function in selectively applying successive axially outwardly directed forces against the rim flange portions 20, 22 in order to determine the fatigue characteristics of the vehicle rim 14, as will hereinafter be described in detail.

Referring now in detail to the construction of the support structure 26, as illustrated in FIG. 1, the structure 26 comprises a generally flat, horizontally extending base portion 30 which is provided with a plurality of support legs or feet, generally designated 32, on the lower side thereof, which legs 32 are adapted to bear or rest upon a suitable work surface, bench or the like (not shown). The support structure 26 comprises a plurality of test assembly support sections 34, 36 and 38, the former two of which extend upwardly and outwardly from the opposite ends of the base portion 30 and the latter of which is supported in a generally horizontal extending position by means of an elongated support member 40 which extends vertically upwardly from the rearward side of the base portion 30. Each of the support sections 34–38 is adapted to support one of the test assemblies 28 for radially inwardly and outwardly adjustable movement commensurate to the diameter of the wheel rim 14 which is being fatigue tested, as will hereinafter be described. Also, the support structure 26 may be provided with means for raising and lowering the wheel 12 thereupon through proper rotation of a suitable adjustment knob or the like 42 which extends outwardly from the forward side of the base portion 30. Such raising and lowering means for the wheel 12 may be of any suitable construction, such as, for example, a helically threaded jack assembly or the like, as is well known in the art. It will be noted that the support structure 26 may be oriented in either a horizontal or vertical position, depending upon the available test facilities.

The means for supporting the test assemblies 28 for movement toward and away from the periphery of the wheel 12 may be of various forms; however, as illustrated in FIG. 2, in the preferred construction shown herein, such positioning means for the assemblies 28 is in the form of a plurality of helically threaded shafts 44 which are threadably mounted within outwardly extending bores 46 formed one in each of the support sections 34, 36 and 38. The inner ends of the shafts 44 are connected through suitable snap rings or the like 48 and support blocks 50 to the outer sides of the assemblies 28 and upon proper rotation of a suitable adjustment wheel or the like 52 affixed to the outer end of the shafts 44, the assemblies 28 will move radially inwardly and outwardly, as will be apparent. The snap rings 48 are adapted to be received within suitable recessed portions in the support blocks 50 and permit rotation of the shafts 44 without imparting any rotative movement to the associated test assemblies 28, whereby said assemblies 28 may be adjustably positioned radially inwardly and outwardly with respect to the wheel 12 without rotating from the positions shown in FIG. 1. It will be readily apparent, of course, that the aforesaid means for adjustably positioning the test assemblies 28 may be achieved through the use of suitable drive motors or the like, such as that indicated at 54 mounted on the outer side of the support section 36, whereby desired radially inwardly and outwardly directed movement of the test assemblies 28 may be automatically or mechanically effected without requiring any adjustment of the wheel 52.

By virtue of the fact that each of the fatigue testing assemblies 28 is of substantially the same construction, the hereinafter described construction of the assembly 28 shown in operative association with the support section 38 of the support structure 26 will be applicable to each of the other of said assemblies 28.

As best seen in FIG. 2, the assembly 28 shown in operative association with the support section 38 of the support structure 26 comprises a generally cylindrical shaped manifold housing 56 which defines an elongated cylindrical bore 58 within which the inner ends of a pair of opposed piston members 60 and 62 are reciprocally mounted. As illustrated, the ends of the piston members 60, 62 disposed interiorly of the bore 58 are formed with annular recessed portions 64 and 66 which are provided with suitable fluid seals, such as resilient O-rings or the like 68 and 70, respectively, adapted to sealingly engage the periphery of the bore 58 so as to prevent any fluid leakage between the outer peripheries of the piston members 60, 62 and the bore 58. The fluid seals 68, 70 are preferably fabricated of a suitable fluid resistant and nonfrictional material such as nylon, Teflon or the like. The bore 58 is preferably provided with some type of means adjacent the opposite ends thereof adapted to limit axially outward movement of the piston members 60, 62. Such means may be in the form of suitable set screws, keyways or the like, or alternatively, may comprise a pair of inwardly extending shoulders 72, 74 adapted to abut against suitable radially extending face portions 76 and 78 formed in the piston members 60, 62, respectively. It will be understood, of course, that the shoulders 72, 74 merely constitute an exemplary manner of limiting axial movement of the piston members 60, 62, and that although in the illustrated embodiment of the present invention, assembly of the piston members 60, 62 within the bore 58 would be extremely arduous since the shoulders 72, 74 appear to restrict the opposite ends thereof, various alternative ways of mounting and retaining the piston members 60, 62 within the bore 58 will readily be apparent to any skilled artisan.

As best seen in FIG. 1, each of the assemblies 28 is provided with a pair of positioning or stabilizing arms 79 adapted to be received between the rim flange portions 20, 22, and firmly engage the intermediate portion 24 of the wheel rim 14 upon operative positioning of the assemblies 28, whereby to positively secure the wheel 12 in a preselected "test" position within the apparatus 10 and prevent any relative movement between the wheel 12 and assemblies 28 during a fatigue testing operation.

The apparatus 10 is preferably adapted to be actuated by means of a source of pressurized hydraulic fluid and is provided with a suitable hydraulic system, schematically illustrated in FIG. 3 and generally designated by the numeral 80. The system 80 comprises a suitable hydraulic fluid reservoir 81 which is communicable with a fluid pump 82 through a hydraulic conduit 84. The pump 82 is adapted to be actuated by a suitable drive motor 86, whereby hydraulic fluid will be pumped from the reservoir 81 through a primary fluid conduit 88 to a servo-valve mechanism 90. The conduit 88 is communicable through an associated hydraulic line 92 with a suitable pressure relief switch 94 and through a conduit 96 to a conventional relief valve assembly 98. The conduit 88 is also communicable through a conduit 100 with a fluid accumulator 102 which may, if desired, be provided with a suitable pressure gauge or the like 104. The servo-valve mechanism 90 is adapted to be communicable through a supply line or conduit 106 with each of the assemblies 28, as will later be described, and excess hydraulic fluid which is not transmitted through the conduit 106 is adapted to be communicated through a conduit 108 to a suitable oil cooling assembly 110 which is, in turn, communicable through a return conduit 112 with the reservoir 81. A suitable check valve mechanism 114 is communicable through conduits 116 and 118 with the conduits 108 and 112, respectively, and is adapted to be pressure actuated in the event an excessive pressure condition exists within the oil cooling assembly 110, as is well known in the art.

The servo-valve mechanism 90 is adapted to be selectively actuated in a manner such that a source of pulsed fluid pressure is communicated through the conduit 106 to the various assemblies 28. As illustrated in FIG. 2, the manifold housings 56 are formed with fluid supply apertures 119 with which the conduits 106 are communicable in any suitable manner, whereupon actuation of the aforedescribed hydraulic system 80, hydraulic fluid under pulsed pressure will be communicated into the interior of the housing 56 to effect outwardly directed movement of the piston members 60 and 62.

In order to facilitate correlating the various operational parts of the rim testing apparatus 10 of the present invention, a brief description of a typical operational cycle will now be given.

In operation, assuming the initial conditions that the wheel 12 is properly positioned on the apparatus 10 in the manner illustrated in FIG. 1, and that each of the assemblies 28 is properly radially positioned such that the stabilizing arms 79 thereof firmly engage the intermediate portion 24 of the wheel rim 14 and that the piston members 60, 62 are properly oriented with respect to the rim flange portions 20, 22, as best seen in FIG. 2, the drive motor 86 and servo-valve mechanism 90 are initially energized, whereby the pump 82 will operate to communicate hydraulic fluid through the conduit 88 to the valve mechanism 90. As previously mentioned, upon energization of the valve mechanism 90, the hydraulic fluid within the conduit 88 will be communicated to the conduit 106 under a pulsed pressure condition, with the result that the piston members 60, 62 will be successively urged axially outwardly of the housing 56 and exert successive axially outwardly directed forces against the rim flange portions 20, 22. In a preferred construction of the present invention, the servo-valve mechanism 90 operates such that the pressure pulses in the conduit 106 occur at approximately 25 times per second; however, this rate may be varied considerably and is limited only by the frequency response of the hydraulic system and the resonance characteristics of the various wheel rims. After operation of the assemblies 28 for a predetermined amount of time, portions of the wheel rim adjacent the assemblies 28 will begin to experience some fatigue, at which time very small cracks will appear in the wheel rim 14 adjacent the juncture of the rim flange portions 20, 22 and the intermediate portion 24 as well as in various portions of the wheel portion 24 itself. Suitable strain gauges, as are well known in the art, may be mounted on the wheel rim 14 at any preselected location in order to determine the stress characteristics under various load conditions of the rim 14 upon continued operation of the assemblies 28. If desired, a suitable penetrant material may be applied on one side of the wheel rim 14, which material, upon the formation of any microscopic fatigue cracks in the rim 14 will penetrate the rim through the cracks and appear on the opposite side thereof, whereby to provide a visual indication of the existence of the cracks prior to the crack being clearly discernible to the naked eye. Also, strips of electrically conductive material or conductive paint may be applied by any suitable means to the wheel rim in a manner such that when a fatigue crack develops in the rim 14, the electrically conductive material or paint will be broken or severed. The material may be connected in any well known manner to the electrical circuit supplying electrical energy to the drive motor 86, with the result that when the conductive material is broken upon the formation of a crack in the rim, the electrical circuit to the motor 86 will be opened, thereby effecting deenergization of any one of the testing assemblies 28 or, alternatively, the entire apparatus 10, at such times as the first fatigue crack is developed in the rim 14. It will be apparent, of course, that various other fatigue testing procedures may be followed, and that the present invention is not limited to any particular one of the aforesaid techniques.

FIG. 4 illustrates a slightly modified embodiment of the fatigue testing assemblies 28 and is shown as comprising a housing 120 which may be affixed by any suitable means to the support sections 34, 36 and 38 of the support structure 26. The housing 120 is formed with an internal cavity 122 within which a pair of actuating members 124 and 126 are pivotably mounted. As illustrated, the member 124 comprises a pair of leg portions 128 and 130 and is pivotably mounted within the cavity 122 by means of a suitable pivot pin 132 and anti-friction bushing or bearing 134. In a similar manner, the actuating member 126 comprises a pair of leg portions 136 and 138, and is pivotably mounted within the cavity 122 by means of a suitable pivot pin 140 and bushing or bearing 142. Disposed directly inwardly (downwardly in FIG. 4) from the cavity 122 is a guide member 144 that is fixedly secured to the housing 120 and defines a generally axially extending elongated guideway or bore 146 within which a pair of force applying members 148 and 150 are slidably mounted. The inner ends of the members 148, 150 are adapted to be operatively engaged with the leg portions 130 and 138 of the actuating members 124 and 126, respectively, such that upon counterclockwise pivotal movement of the member 124 and clockwise pivotal movement of the member 126, the members 148, 150 will be biased outwardly into engagement with the rim flange portions 152 and 154 of a vehicle wheel rim 156 which is being subjected to a fatigue testing operation. It will be noted that the force applying members 148 and 150 are dimensioned so as to engage the rim flange portions 152, 154 in essentially the same manner as the piston members 60 and 62 of the assemblies 28, with the result that the members 148, 150 may operate in the same way as the piston members 60, 62 in determining the fatigue characteristics of the wheel rim 156.

Means for effecting the desired pivotal movement of the members 124 and 126 is achieved by a pair of reciprocally mounted piston members 158 and 160 that are disposed within suitable bores 162 and 164 formed in the housing 120. The piston member 158 is formed with a reduced diameter forward end section 166 which is reciprocally carried within a suitable sleeve bushing 168 and is adapted to operatively engage the leg portion 128 of the member 124. The piston member 158 also comprises an enlarged diameter rearward section 170 that is slidably carried within a suitable sleeve bushing 172 and is provided with a pair of annular recessed portions 174 and 176 having a pair of sealing members 178 mounted therein and adapted to sealingly engage the inner periphery of the bushing 172. The outer end of the bore 162 is communicable through a suitable closure plate 180 and fluid fitting 182 with a fluid conduit 184 adapted to supply hydraulic actuating fluid to the fluid piston member 158, as will later be described.

The piston member 160 is substantially identical in construction to the piston member 158 and comprises a forward end section 186 reciprocally carried within a suitable sleeve bushing 188 and adapted to operatively engage the leg portion 136 of the member 126. The piston member 160 further comprises an enlarged diameter section 190 that is formed with annular recesses 192 and 194 which carry fluid seals 196 adapted to sealingly engage the inner periphery of a suitable sleeve bushing 198 disposed within the outer end of the bore 164. A closure plate 200 and fluid fitting 202 are adapted to communicate the interior of the bore 164 with a suitable fluid conduit 204.

In operation, the conduits 184 and 204 are adapted to be communicable with a source of pulsed fluid pressure, such as the aforedescribed conduit 106 and servo-valve mechanism 90, whereby hydraulic actuating fluid under pulsed pressure is communicated to the outer ends of the bores 162 and 164 to effect actuation of the piston members 158, 160 and members 126, 150 and 124, 148 in the same manner as the piston members 60 and 62 were actuated in the assemblies 28. It will be noted that the effective lengths of the leg portions 128, 130 and 136, 138 from the pivotal axes of the pivot pins 132 and 140 are preferably, although not necessarily, equal in size. Accordingly, assuming that the pressure of the actuating fluid acting against the piston members 158, 160 is the same, the magnitude of the applied forces transmitted from the piston members 158, 160 to the force applying members 148, 150 through the members 124 and 126 will be equal. It will be noted that for certain rim design applications, it may be desirable to apply different loads to each of the wheel rim flanges, in which case, the lengths of the leg portions 128, 130 and 136, 138 may be unequal.

The embodiment of the fatigue testing assemblies illustrated in FIG. 4 is intended to find particularly useful application when it is desired to test vehicle wheel rims that have relatively small axial dimensions, in which case it is necessary to locate the housing 120 and operative piston members, such as the members 158, 160 radially outwardly from the rim flange portions 152 and 154 due to the relatively small axial distance that exists between the rim flange portions 152 and 154 in small vehicle wheel rims. It will be apparent, of course, that the embodiment of the assemblies shown in FIG. 4 may be readily used on larger wheel rims such as the rim 14 shown in FIG. 2, and that said last described embodiment is not necessarily limited to use with only relatively small wheel rims such as the rim 156.

In accordance with further principles of the present invention, the rim testing apparatus disclosed herein, besides finding useful application in determining the fatigue characteristics of double flanged wheel rims, such as the wheel rim 14, may also find particularly useful application in determining the fatigue characteristics of wheel rims of the type having only a single rim flange, such as, for example, a typical wheel rim as is conventionally used on trucks and other relatively large vehicles. Accordingly, FIGS. 5 through 7 illustrate several different modifications of the present invention which may be used in determining the fatigue characteristics of single flanged wheel rims.

Referring now in detail to FIG. 5, a vehicle wheel rim 300 is shown as comprising a single radially outwardly extending rim flange portion 302 and is secured by any suitable means to an associated rim testing support structure, generally designated 304. The fatigue characteristics of the wheel rim 300 are adapted to be analyzed by means of one or more testing assemblies, one of which is illustrated in FIG. 5 and generally designated by the numeral 306. The assembly 306 comprises a manifold housing 308 defining an annular cylindrical bore 310 within which an elongated, generally cylindrically shaped piston member 312 is reciprocally mounted. The piston member 312 is formed with an annular recessed portion 314 within which a suitable sealing member, such as an O-ring or the like 316 is received, which member 316 is designed to peripherally engage the bore 310 to provide a fluid tight seal around the outer periphery of the piston member 312, as is well known in the art. An inwardly extending shoulder portion 318 is provided adjacent the outer end of the bore 310 for limiting outward movement of the piston member 312, and the inner end of the bore 310 is communicable through suitable fluid passages 320 and 322 with a fluid fitting 324 and fluid conduit 326, all of which are adapted to function in selectively communicating hydraulic actuating fluid to the piston member 312. As was described in connection with the rim testing assembly 28, the shoulder 318 is shown merely as an exemplary means of limiting axial movement of the piston member 312. It will, of course, be apparent to any skilled artisan that, although in the illustrated embodiment, assembly of the piston member 312 within the bore 310 would be difficult due to the shoulder 318 restricting the outer end of the bore 310, various alternate ways of retaining the piston member 312 may be utilized. It will be seen that upon communication of pulsed actuating fluid to the interior of the bore 310, the piston member 312 will be successively urged toward the right in FIG. 5, whereby the outer end 328 thereof will exert axially outwardly directed forces against the wheel rim portion 302 in order to determine the fatigue characteristics of the wheel rim 300 in the same manner as hereinabove described.

Figure 6:
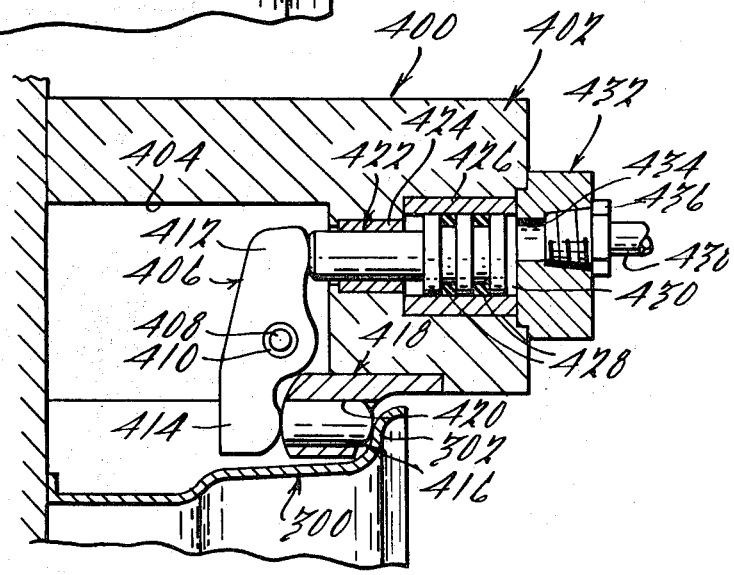
FIG. 6 is a fragmentary cross-sectional view of still another embodiment of the present invention.

FIG. 6 illustrates another embodiment of the present invention adapted for operative association with a single flanged wheel rim such as the aforementioned rim 300 having a single rim flange portion 302. The fatigue testing device illustrated in FIG. 6 is shown as comprising a testing assembly, generally designated 400, which includes a manifold housing 402 having an internal cavity 404 within which an actuating member 406 is pivotably supported by means of a suitable pivot pin 408 and antifriction bearing or bushing means 410. The actuating member 406 comprises a pair of leg sections 412 and 414, the latter of which is adapted to abut against a force applying member 416 slidably disposed within a suitable guideway 418 which defines an internal bore 420, the guideway 418 being fixedly secured to the lower side of the manifold housing 402 by any suitable means. The leg section 412 of the actuating member 406 is adapted to be selectively engaged by one end of a piston member 422 which is reciprocally mounted within a pair of suitable sleeve bushings 424 and 426 provided in the housing 402. The piston member 422 is provided with a pair of suitable O-rings or similar sealing members 428, with the outer end of the piston member 422 being communicable with the interior of an annular bore 430 within which the sleeve bushings 424, 426 are mounted. The end of the bore 430 is closed by a suitable closure plate 432 that is formed with a central passage 434 within which a suitable fluid fitting 436 and fluid conduit 438 are mounted. It will be seen that when hydraulic fluid is communicated into the interior of the bore 430, the piston member 422 will exert successive forces against the leg section 412 of the member 406, with the result that the force applying member 416 will exert successive axially outwardly directed forces against the rim flange portion 302. As previously described in connection with the test assembly illustrated in FIG. 4, the assembly 400 is particularly adapted for operative use with wheel rims having a relatively small axial dimension in that substantially the entire assembly 400 is located radially outwardly from the wheel rim during a testing operation.

Figure 7:
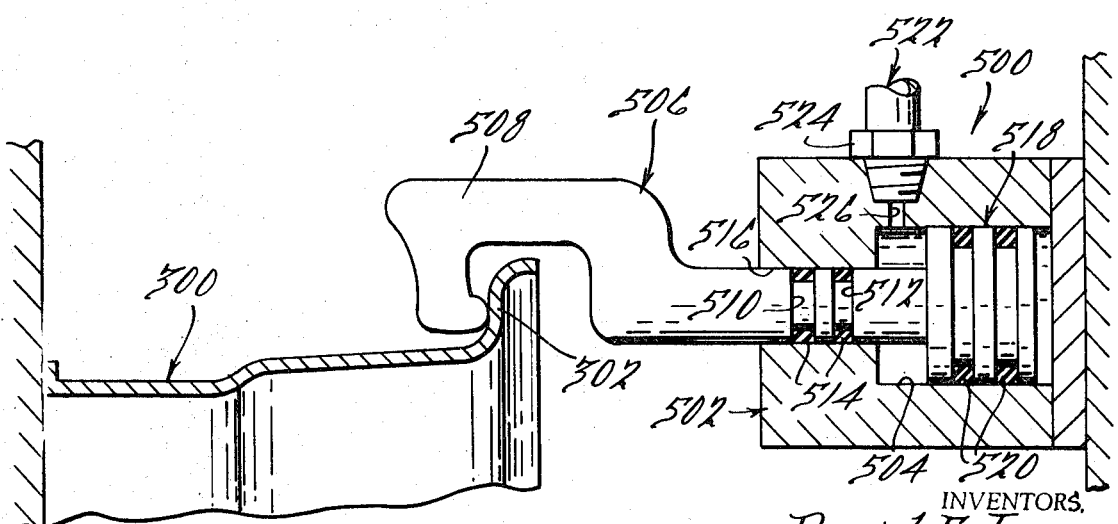
FIG. 7 is a fragmentary cross-sectional view of yet a further embodiment of the present invention.

FIG. 7 illustrates yet a further embodiment of the present invention which is adapted to find particularly useful application in testing wheel rims of the type having only a single rim flange, such as the wheel rim 300 illustrated in FIGS. 5 and 6. The device illustrated in FIG. 7 comprises a test assembly, generally designated 500, having a manifold housing 502 which defines an internal cavity 504. The assembly 500 further comprises a generally hook-shaped force applying member 506 which is formed with a C-shaped rim flange engaging section 508 adapted to partially receive and engage the rim flange portion 302 of the wheel rim 300 in the manner shown in FIG. 7. The end of the force applying member 506 opposite that in which the section 508 is formed is provided with a pair of annular recessed portions 510 and 512 within which a pair of O-rings or similar type sealing members 514 are located, the members 514 being adapted to peripherally engage the surface of a passage or bore 516 within which the outer end of the member 506 is slidably disposed. The extreme outer end of th emember 506 is operatively connected to a suitable piston member or the like 518 which is reciprocally mounted within the cavity 504 and is provided with suitable sealing members 520 for providing a fluid tight seal between the outer periphery of the member 518 and the inner surface of the cavity 504. Hydraulic fluid is adapted to be communicated into the cavity 504 by a suitable supply line or conduit 522 which is operatively connected to the housing 502 by means of a suitable fluid fitting 524 communicable through a passage 526 with the interior of the cavity 504. In operation, hydraulic fluid under pulsed pressure is communicated into the interior cavity 504, whereby the piston member 518 will be forced toward the right in FIG. 7, with the result that the C-shaped section 508 of the member 506 will exert successive axially outwardly directed forces against the rim flange portion 302 of the wheel rim 300 in order to determine the fatigue characteristics thereof in a manner hereinabove described.

It will be seen from the foregoing description of the present invention that a new and improved vehicle wheel rim testing apparatus is provided which is adapted to overcome the various shortcomings of similar type testing apparatus heretofore known and used. By virtue of the fact that the test assemblies 28 may be selectively oriented circumferentially of the wheel rim being tested, the fatigue characteristics of a wheel rim at any particular circumferential portion thereof may be carefully examined. Moreover, the apparatus of the present invention will be found to determine the fatigue characteristics of a wheel rim in a considerably shorter period of time than has been heretofore possible, a typical testing period for a passenger car wheel rim with the apparatus of the present invention taking approximately one hour as compared to a testing period of up to 60 hours required with heretofore available equipment. By virtue of the fact that the present invention is of an extremely simple and compact design, it may be economically manufactured, installed and maintained and will find universality of application.

While it will be apparent that the preferred embodiment illustrated herein is well calculated to fulfill the objects above stated, it will be appreciated that the present invention is susceptible to modification, variation and change without departing from the proper scope or fair meaning of the subjoined claims.

What is claimed is:

1. In an apparatus for testing a wheel rim having a main body portion, two radially outwardly extending flange portions and a central hub, means for supporting a wheel rim in a preselected test position, a pair of force applying elements disposed between said flange portion and lying in a plane generally tangent thereto, said elements being reciprocally mounted and adapted to move opposite of each other and apply forces of predetermined magnitude against said flange portions, second support means for supporting said elements at various adjusted positions located radially of said body portion while maintaining said elements in a plane parallel to said first mentioned plane, and means for effecting repetitive actuation of said force applying elements, whereby said elements apply succesive axially directed forces of a predetermined magnitude directly against said flange portions, thereby making possible the determination of the fatigue characteristics between the flange portions and body portion of the wheel rim.

2. In an apparatus for testing a wheel rim having a main body portion, two radially outwardly extending flange portions and a central hub, a support structure for supporting a wheel rim in a preselected test position, a plurality of force applying assemblies mounted circumferentially around the wheel rim supported on said structure, said force applying assemblies comprising at least one force applying means disposed between said flange portion and lying in a plane generally tangent thereto, said means being reciprocally mounted and adapted t oapply forces of predetermined magnitude against one of said flange portions, second support means for supporting said assemblies at various adjusted positions located radially of said body portion while maintaining said elements thereof in planes parallel to said first mentioned plane, and means for effecting repetitive actuation of said force applying elements, whereby said elements apply succesive axially directed forces of a predetermined magnitude directly against said flange portions, thereby making possible the determination of the fatigue characteristics between the flange portions and body portion of the wheel rim.

3. In the method of testing a wheel rim having a main portion, two radially outwardly extending flange portions and a central hub, supporting a wheel rim in a preselected test position, interposing a pair of force applying elements between said flange portion and in a plane generally tangent thereto, supporting said elements for opposed reciprocal movement axially of said hub whereby said elements are adapted to apply forces of predetermined magnitude against said flange portions, adjustably positioning said elements radially of said body portion while maintaining said elements in a plane parallel to said first mentioned plane, and effecting repetitive actuation of said force applying elements, whereby said elements apply successive axially directed forces of a predetermined magnitude directly against said flange portions, thereby making possible the determination of the fatigue characteristics between the flange portions and body portion of the wheel rim.

4. An apparatus as set forth in claim 1 which includes a pair of reciprocally mounted pistons, a manifold housing for supporting said pistons radially outwardly from the wheel rim, and lever means pivotably mounted on said manifold housing and adapted to apply an axially directed force of predetermined magnitude against said rim flange portions in response to actuation of said pistons.

5. An apparatus as set forth in claim 1 wherein said means for effecting selective actuation of said force applying elements comprises a source of pulsed pressurized fluid.

6. An apparatus as set forth in claim 2 wherein said assemblies are mounted for radially inward and outward movement relative to the wheel, whereby said structure may accommodate wheel rims of different diameters.

7. An apparatus as set forth in claim 2 wherein each of said assemblies comprises a manifold housing and means including a source of pulsed pressurized fluid for selectively actuating said pistons.

8. An apparatus as set forth in claim 7 wherein the pistons of each of said assemblies are coaxially mounted and are adapted to exert opposed axially directed forces against said rim flange portions of the wheel supported on said structure.

9. An apparatus as set forth in claim 7 wherein each of said assemblies includes a reciprocally mounted piston, a manifold housing for supporting said piston radially outwardly from a wheel rim, and lever means pivotably mounted on said manifold housing and adapted to apply an axially directed force of predetermined magnitude against said rim flange portion in response to actuation of said piston.

10. An apparatus as set forth in claim 1 which includes a support structure for supporting a wheel rim in a generally vertically disposed test position, a plurality of test assemblies mounted circumferentially around the wheel rim supported on said structure, each of said assemblies comprising a manifold housing, a pair of piston members, and means including a source of pulsed pressurized fluid for selectively actuating said pistons, whereby axially directed forces are successively applied against said rim flange portions of said wheel.

11. The method as set forth in claim 3 which includes the step of selectively actuating said elements members by means of a source of pulsed pressurized fluid.

12. The method as set forth in claim 3 which includes the step of actuating said force applying elements by selectively biasing at least one pivotably mounted lever member located adjacent the wheel rim.

13. The method as set forth in claim 3 which includes the step of providing for applying elements at at least two circumferentially spaced locations around a wheel rim, whereby the fatigue characteristics of a wheel rim can be determined simultaneously at said two locations.

References Cited

UNITED STATES PATENTS

| | | | |
|---|---|---|---|
| 1,721,986 | 7/1929 | Christensen | 92—75 |
| 2,354,562 | 7/1944 | Webb | 73—90 |
| 2,953,018 | 9/1960 | Volmer | 73—91 |
| 3,097,572 | 7/1963 | Macy | 92—129 |
| 3,412,601 | 11/1968 | Hand et al. | 73—91 |

JAMES J. GILL, Primary Examiner

M. SMOLLAR, Assistant Examiner

U.S. Cl. X.R.

73—100